April 7, 1942.    T. P. CHASE    2,278,645
EMERGENCY BRAKE LEVER
Filed Jan. 8, 1940
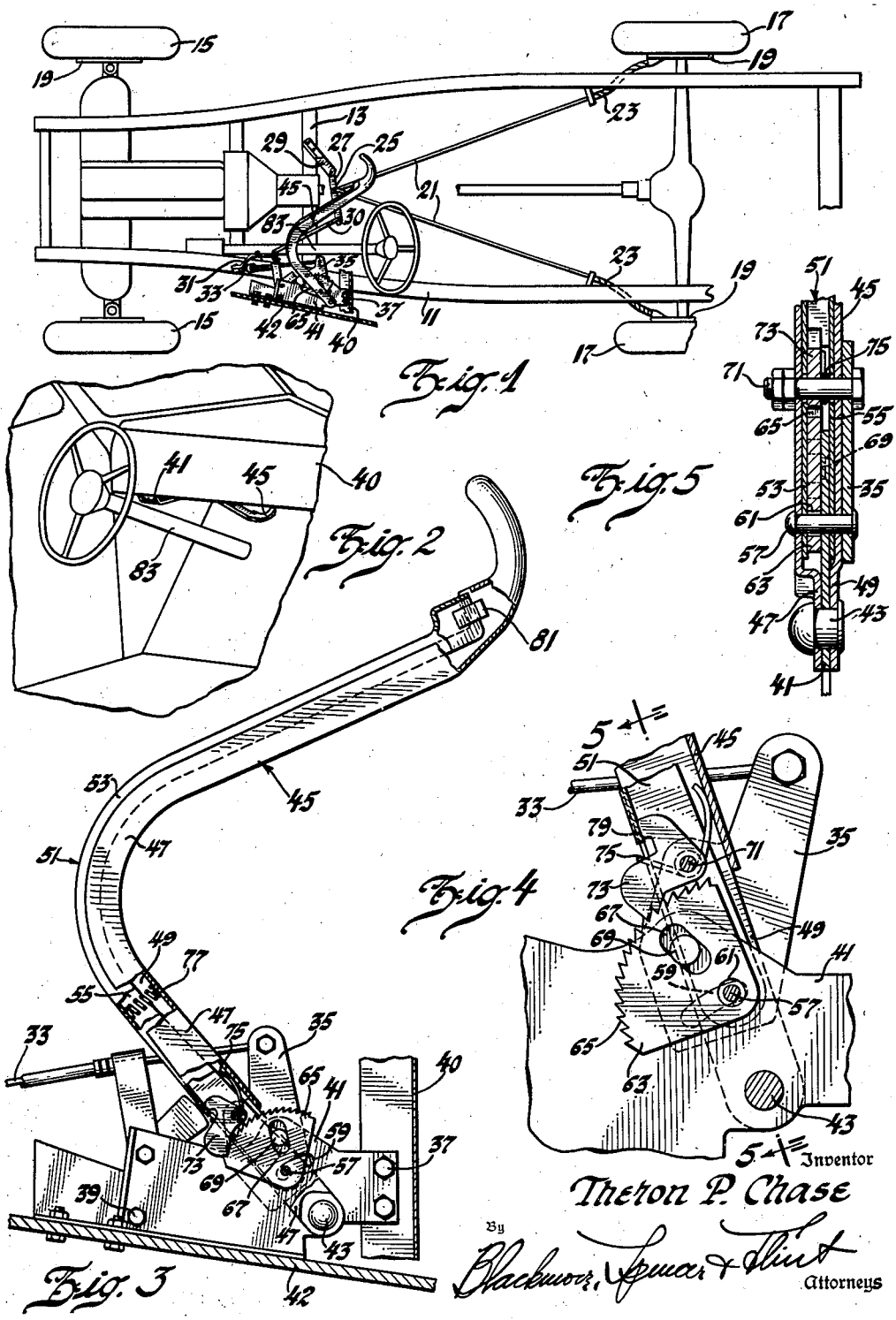
Inventor
Theron P. Chase
By Blackmore, Spencer & Flint
Attorneys Patented Apr. 7, 1942

2,278,645

UNITED STATES PATENT OFFICE 2,278,645

EMERGENCY BRAKE LEVER

Theron P. Chase, Detroit, Mich., assignor to General Motors Corporation, Detroit, Mich., a corporation of Delaware Application January 8, 1940, Serial No. 312,835

2 Claims. (Cl. 74—523)

This invention relates to vehicle brakes and is concerned more particularly with an applying means for emergency operation of said brakes.

An object of the invention is the provision of conveniently accessible means whereby operation of the brakes is made possible without delay in an emergency.

Other objects and advantages will be understood from the description which follows:

Figure 1 is a plan view of a vehicle chassis and parts of the body, together with the emergency brake operating means mounted thereon.

Figure 2 is a perspective view from within the body to show the relation of the steering column, panel and emergency brake lever.

Figure 3 is a plan view on a larger scale than Figure 1, showing the manually operable lever and related parts.

Figure 4 is a plan view showing certain parts displaced from their positions shown in Figure 3.

Figure 5 is a section on line 5—5 of Figure 4.

On the drawing, reference character 11 is used to designate one of the longitudinal members of a vehicle frame and 13 is a cross member. The frame is mounted on front wheels 15 and rear wheels 17. Each wheel has a brake drum 19. The shoe assemblies within the drum are not shown. They may be of any preferred form. The service brake system is not illustrated for the reason that it is not a part of this invention.

For emergency operation the brakes of the rear wheels only are used. They are actuated by tension members 21 extending through housings 23 and into the drums. The members 21 are connected at 25 to a mid-point of lever 27, the latter being terminally pivoted to a bracket 29 secured to cross frame member 13. To the other end of lever 27 is connected a link 30, the link extending to a lever 31 suitably mounted on the chassis. From lever 31 a cable 33 extends to the end of a lever 35 which lever is mounted on the body in a way to be described.

Secured at 37 and 39 to a flange of the instrument panel 40 of the body and to a body member 42 respectively is an anchor bracket 41. The bracket is bent as shown immediately forward of the instrument panel so that it lies below the panel a shown in Figure 2. On a vertical pivot 43 carried by the bracket is rotatably supported a horizontally extending hand lever 45. The hand lever is U-shape in section for the greater part of its length and its pivoted end takes the form of spaced plates 47 and 49 straddling the anchor plate 41 at the pivot. Plates 47 and 49 are bent and spaced apart near the pivot as shown best by Figure 5. A reversely curved ratchet releasing lever is marked 51. It, too, is of U-shape in section so that it may be received within the lever 45. Its flat ends 53 and 55 lie within plates 47 and 49 and are pivoted by a pin 57 which extends through plates 47 and 49. A slot 59 is formed in bracket 41 to permit movement of the pin 57 as it moves with lever 45 about the center of rotation of the lever at 43. Pin 57 also extends through an aperture 61 of a segmental ratchet plate 63, the plate being provided with teeth 65. Pin 57 also extends through an aperture in lever 35. The ratchet plate has a slot 67 to receive a pin 69 carried by anchor plate 41. Another pin 71 connects the lever 35 and the plates 47 and 49 of lever 45. Plates 53 and 55 of lever 51 have enlarged openings through which the pin 71 passes. Pivoted on pin 71 and adjacent arm 47 is a pawl 73 adapted to engage teeth 65 and biased to effect such engagement by a spring 75. Levers 51 and 45 are normally spaced and occupy the positions shown by Figure 3 under the action of a coil spring 77. When so positioned, spring 75 may hold the pawl 73 in contact with the ratchet teeth. When lever 51 is depressed into the recess of lever 45, a face 79 of lever 51 engages the pawl and rotates it away from the ratchet teeth. Suitable noise preventing means such as a rubber block 81 is secured to the end of lever 51.

It will be noticed that lever 45 extends horizontally and that it is curved to extend around the forward side of the steering column 83. It then extends to the rear to bring the hand grip at its end somewhere near a mid-point transversely of the vehicle. It is therefore in a position readily accessible for the operator and also it can easily be reached by the passenger seated at the right of the driver. In operation the lever is drawn toward the rear. When so rotated the lever 35 which is connected to lever 45 by pins 57 and 71 is similarly rotated and the brakes of the rear wheels are spread into frictional engagement with the drums at the same time pin 57 cooperating with fixed pin 69 and slot 67 rotates the ratchet 63 from the position shown in Figure 3 to the position shown in Figure 4. By this means the ratchet has a rotation of its own in a direction which is opposite that of the lever 45. When the brake lever rotation ceases the pawl prevents its return since its return requires a reverse rotation of the ratchet, a movement which is prevented by the pawl. To release the pawl, lever 51 is depressed. As it rotates about its pivot 57 it pushes the pawl from the ratchet against the action of spring 75.

I claim:

1. In a vehicle having a chassis with a steering column and a superposed body having a panel, a brake lever pivoted to one side of said vehicle and extending horizontally to locate its power end between the sides thereof, said lever being shaped to pass in front of said steering column and terminating in a hand grip rigid with the lever adjacent the vertical plane of the panel.

2. The invention defined by claim 1, the horizontal plane of said lever being slightly below the panel.

THERON P. CHASE.